July 26, 1966  C. D. TONEY, JR  3,262,302
METHOD OF FORMING THREADED WIRE
Original Filed Feb. 14, 1962  3 Sheets-Sheet 1

INVENTOR.
CHARLES D. TONEY, JR.
BY Channing L. Richards &
Dalbert U. Shefte
ATTORNEYS

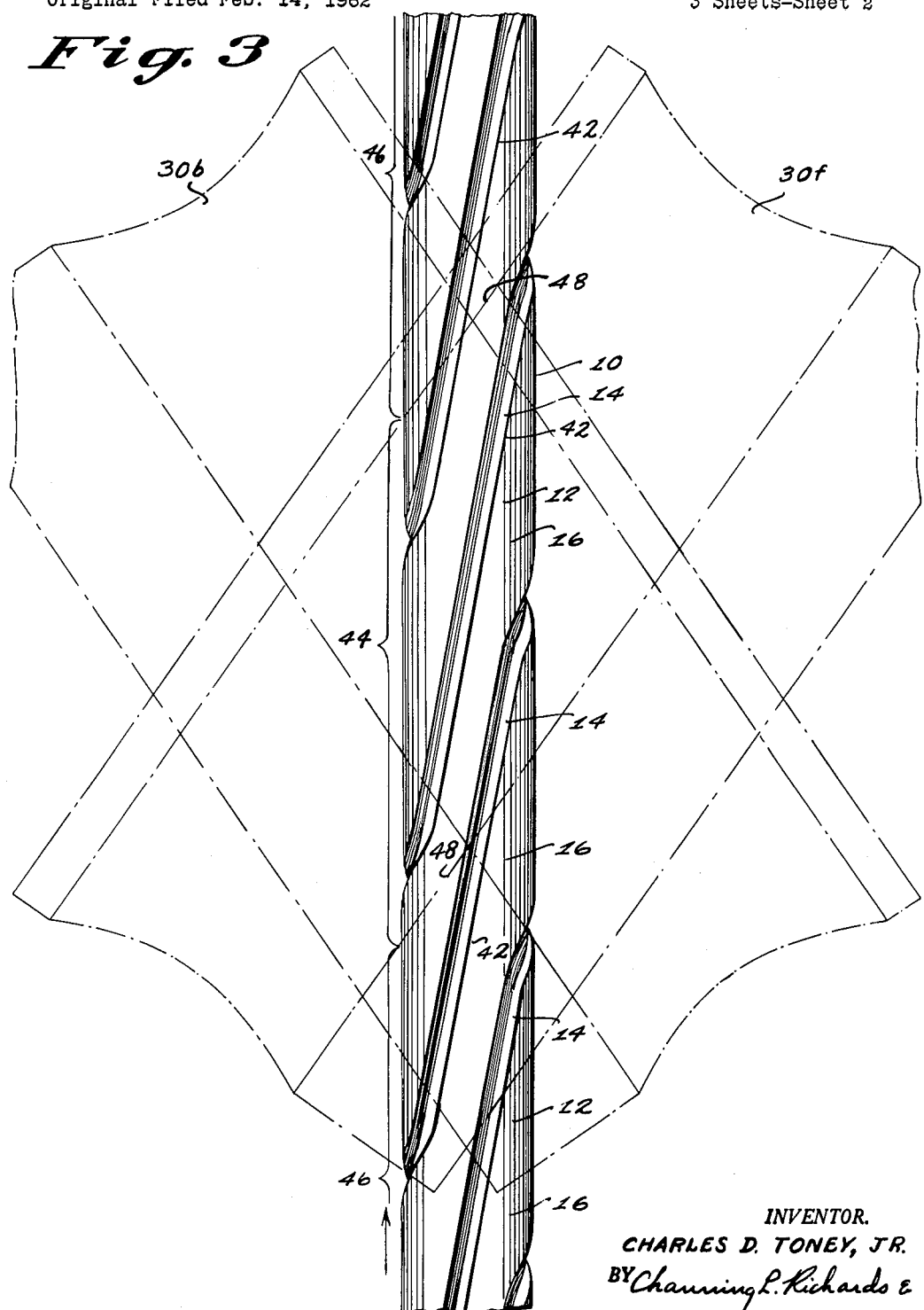

July 26, 1966  C. D. TONEY, JR  3,262,302
METHOD OF FORMING THREADED WIRE
Original Filed Feb. 14, 1962  3 Sheets-Sheet 3
*Fig. 4*  *Fig. 5*
INVENTOR
CHARLES D. TONEY, JR.
BY
Channing L. Richards &
Dalbert U. Shefte
ATTORNEYS 3,262,302
METHOD OF FORMING THREADED WIRE
Charles D. Toney, Jr., Atlanta, Ga., assignor to The Auto-Soler Company, a corporation of Georgia
Continuation of application Ser. No. 173,197, Feb. 14, 1962. This application Feb. 3, 1965, Ser. No. 430,034
8 Claims. (Cl. 72—366)

The present invention relates generally to threaded wire and particularly to a new and unique method and means for forming threaded wire in an expeditious and inexpensive manner. This application is a continuation of copending application Serial No. 173,197, filed February 14, 1962, now abandoned, and is related to copending application Serial No. 482,974, filed July 21, 1965, which latter application is a division of the former parent application and claims the apparatus of the present invention.

The threaded wire production by the present invention lends itself to advantage particularly for use with fastener forming and inserting machines in which wire is formed into fastener lengths and inserted into objects to hold them together; the threaded surface configuration enhancing straight driving and holding strength characteristics of the fasteners formed and inserted by these machines. A representative example of such a fastener forming and inserting machine is illustrated and described in U.S. Patent No. 2,944,758, issued July 12, 1960.

Briefly described the threaded wire of the present invention is produced by impressing discontinuous segments of spiral, thread-like grooves at the surface of a wire to be threaded, while causing the impressions to progress in a spaced sidewise succession about the wire in a spiral path. Preferably the impressions are made in a pair of diametrically opposed spiral paths with the pitch of the paths such that the paths complement each other in a generally contiguous alternation along the length of the wire, which contiguity in combination with a general spiral alignment of the discontinuous groove segments of adjacent paths produces substantially continuous thread-like spiral grooves around the wire.

Such impression of discontinuous groove segments at the surface of a wire in a sidewise succession following a spiral path is obtained according to the present invention with means characterized by a cylindrical die having a die surface formed at a circumferential concavity. This concave die surface provides extended contact with te surface of a wire when the wire is seated diagonally in the concavity. Also, the diagonal positioning of the wire with respect to the concavity results in the die surface following a spiral path when it is rolled around the wire to impress the die configuration thereat. A pair of such dies arranged in diametrical opposition and at a proper inclination will impress groove segments in the aforementioned pair of complementary contiguous spiral paths.

To impress thread-like groove segments on the wire with these dies, their die surfaces are formed with spaced, parallel ridges that extend across the concavity at an inclination thereto less than the inclination of the diagonally seated wire so that the groove segments formed by the ridges of the dies will extend across the spiral paths of impression on the wire, thereby permitting arrangement of the grooves of adjacent paths in alignment to form substantially continuous thread-like grooves.

The above-described concave die surface feature of the die of the present invention is particularly applicable to the production of the threaded wire of the present invention using the method of the present invention. However, this concave die surface feature is applicable as well to the production of surface configurations other than threads or grooves.

Although the term "threaded" is used throughout the present specification and claims it should be understood that this term is not intended to be limited to a strict interpretation as the "thread" of the present invention may be merely a simulated thread and need not have a truly helical configuration nor be truly continuous.

The features and advantages of the present invention will be apparent from the following descripiton and accompanying drawings, in which:

FIG. 3 is a plan view of a length of threaded wire according to the present invention and illustrating the position of the forming dies for forming the threaded configuration in accordance with the present invention;

FIG. 4 is a plan view of a sample length of wire impressed with groove segments resulting from the action of only one of the forming dies employed in accordance with the present invention; and FIG. 5 is a further plan view of a corresponding sample length of wire impressed with complementary groove segments resulting from the action of an opposed pair of forming dies in accordance with the present invention.

The present invention will now be described in relation to a preferred embodiment in which a surface forming die is used in a method of spirally configurating wire to produce a threaded wire. This threaded wire 10 has threads 12 formed by spaced spiral grooves 14 with flat spiral surfaces 16 therebetween. This threaded configuration provides particularly desirable improved straight driving and holding strength characteristics in fasteners formed from this wire.

Figure 1:
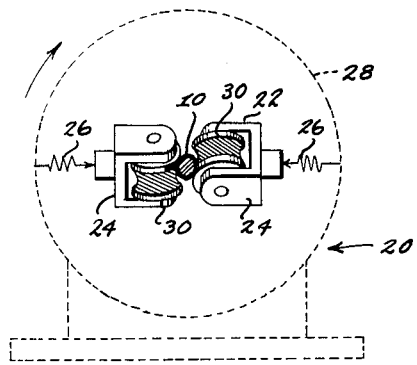
FIG. 1 is a diagrammatic illustration of an apparatus for carrying out the principles of the present invention with a pair of forming dies of the present invention.

The threaded wire 10, illustrated in substantial enlargement in FIG. 3, is produced according to a preferred embodiment of the present invention using the forming apparatus 20 illustrated in FIG. 1. This apparatus 20 includes thread forming means 22 that impress a surface configuration on the wire 10 as it is drawn through the apparatus 20.

The thread forming means 22 comprises a pair of die rolls 30 disposed in diametrical opposition with respect to the traveling wire 10. These rolls 30 are each mounted for free rotation in a yoke 24 slidably supported in a rotating assembly indicated diagrammatically at 28, and urged diametrically inwardly by suitable biasing means indicated diagrammatically at 26, which may be in the form of a spring or a lever arm actuated by centrifugal force or any other suitable means.

The details of the assembly construction 28 do not form a part of the present invention and can be of any suitable conventional construction. This assembly 28 is mounted for rotation in the direction of the arcuate arrow in FIG. 1 and suitable drive means (not shown) are provided to impart positive rotation to the assembly 28, thereby revolving the die rolls 30 around the wire 10 as the wire is drawn through the forming apparatus 20 with the diametrical opposition of the rolls 30 and the urging of the biasing means 26 causing the wire 10 to be tightly clamped between the rolls 30 for impressing the surface configuration of the rolls onto the surface of the wire. In addition, the yokes 24 are inclined to position the rolls 30 with their axes inclined to a plane perpendicular to the axis of the wire and with the rolls equally inclined but in opposite directions so that as the wire is drawn through the forming apparatus 20 with the assembly 28 rotating the die rolls 30 will progress around the surface of the wire 10 in spiral paths.

Figure 2:
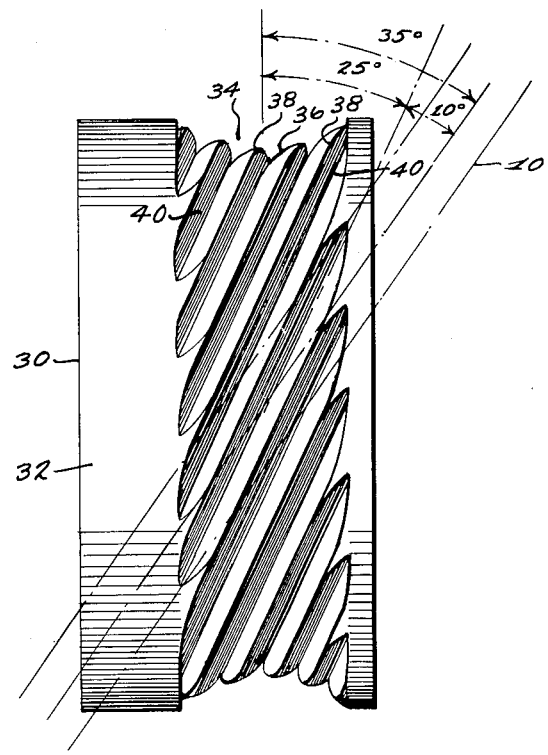
FIG. 2 is a plan view of a forming die of the type illustrated in FIG. 1 with an indication of the preferred diagonal position of a wire for proper die forming engagement of the wire by the die.

One of the die rolls 30 is shown in FIG. 2 substantially enlarged for clarity of detail. This roll 30 is seen to comprise a cylindrical body 32 around the circumference of which there is formed an arcuate concavity 34 having a die surface 36 of a desired configuration to produce by impression the desired configuration at the surface of the wire. To produce the previously described threaded surface 12 on the wire 10 the die surface 36 of the circumferential arcuate concavity 34 is composed of spaced substantially parallel ridges 38 with complementary grooves 40 therebetween. These ridges 38 and associated grooves 40 extend across the arcuate concavity 34 at an inclination with respect to the axis of the die roll 30 with the result that the ridges 38 impress discontinuous groove segments 42 at the surface of the wire 10 that extend across the paths of impression.

The circumferential arcuate concavity 34 is formed with a radius of curvature greater than the radius of the wire 10 to be formed so that when the roll 30 is inclined with respect to the wire as aforementioned during the forming operation, the wire 10 will be seated in the concavity with extended contact between the die surface 36 of the concavity 34 and the surface of the wire 10. In the preferred embodiment the concavities 34 of the die rolls 30 are shaped in relation to the wire size and respective inclination to provide forming contact substantially fully across the width of the concavities 34, thereby forming discontinuous groove segments 42 at the surface of the wire 10 in paths 44 and 46 (FIG. 3) of widths substantially equivalent to the width of the concavity 34.

As the die roll 30 follows a spiral path 44 around the wire 10 the ridges 38 make spiral contact with the wire surface and therefore form the groove segments 42 in a spiral configuration. The spiral configuration formed by each one of the die rolls 30 is shown by FIG. 4 to be characterized by a plurality of discontinuous groove segments formed at the surface of the wire 10 with each segment inclined endwise in relation to the longitudinal axis of the wire and the successively formed groove segments disposed parallelly in sidewise spaced succession spirally around the wire at a pitch less than the inclination of the segments. In order to form the groove segments 42 at an inclination so that they extend across the paths 44 and 46 in the same spiral direction as the paths but at a greater pitch (the advance measured longitudinally along the wire of one complete spiral revolution) than the path, the ridges 38 of the die surface concavity 34 are inclined to the circumferential center line of the concavity at an angle less than the corresponding inclination of the inclined or diagonal position of the wire 10.

With a pair of rolls 30 operating in the forming apparatus 20 of FIG. 1, the wire is formed with two diametrically opposed paths 44, 46 (FIG. 3) with the angle of inclination of the rolls and the width of the path-forming concavity being related to form the paths 44 and 46 in substantial contiguity with the individual revolutions of the paths being disposed in contiguous alternation along the length of the wire 10. The location of the contiguous edges of the paths 44 and 46 is indicated by the dash lines 48 in FIG. 3. The location of the rolls with respect to the wire to form these paths is seen in dot-dash lines in FIG. 3 with the front roll indicated as 30f and the back roll indicated as 30b. FIG. 5 shows the actual appearance of threaded wire thus formed.

In the preferred embodiment, the grooved segments 42 of adjacent paths 44, 46 are generally spirally aligned to produce substantially continuous thread-like grooves along the entire length of the wire 10. This alignment is accomplished by forming the die rolls 30 with identical die surfaces 36 so that the ridges 38 have the same pitch on each die. As these dies progress around the surface of the wire the ridges 38 on each die tend to align themselves with the adjacent groove segments 42 in the contiguous path formed by the opposite die. To continue this general spiral alignment throughout the length of the wire, the groove segments 42 in succeeding revolutions of the same path should be spaced with relation to the lengths of the spiral path revolutions so that there is general spiral alignment of grooves in succeeding revolutions of each path as well as alignment of grooves in adjacent revolutions of the different paths.

However, it is not necessary that precise alignment be obtained in adjacent revolutions of the different paths and in succeeding revolutions of the same paths. Thus, the alignment shown in FIG. 3 may vary due, for example, to slight misalignment or slight skew of the curvature imparted at the ends of the ridges 38. A general spiral alignment is all that is desired in the threaded configuration for most purposes. The FIG. 5 illustration exhibits the lack of continuous spiral alignment of groove segments formed according to the present invention in wire 10 that has been found particularly well suited for use in fastener forming and inserting machines, and it will be noted that the groove segments remain discernible while producing an aggregate simulation of spiral threading.

The depth and width of the grooves 14 and therefore the width of the flat surfaces 16 are dependent upon the degree of impression of the ridges 38 of the die surfaces 36 of the rolls 30. If the force of the biasing means 26 is increased, the degree of impression of the ridges 38 will thereby increase the depth and width of the formed grooves 14 and decrease the width of the intermediate flat surfaces 16.

In the embodiment illustrated, the spiral thread-like grooves are produced with the dies 30 inclined at an angle of 35 degrees with respect to the length of the diagonally seated wire, with the diametrically opposed rolls being oppositely inclined at the same angle to produce spiral paths inclined at this same 35 degree angle. The ridges 38 on the die surfaces 36 of the rolls 30 are formed at an inclination of 25 degrees to the circumferential center of the die, thereby producing a 10 degree inclination of the ridges with respect to the wire, which ridges impress grooves 40 on the wire 10 at this same 10 degree angle.

The present invention has been described in detail above for purposes of illustration only and is not intended to be limited by this description or otherwise except as defined in the appended claims.

I claim:
1. The method of spirally configurating wire which comprises impressing discontinuous segments of spaced, spiral, thread-like grooves at the surface of a length of wire, and simultaneously impressing said discontinuous segments in a sidewise spaced succession following a spiral path about said wire of a pitch less than the pitch of the impressed groove segments so that the groove segments extend across said path.

2. The method of spirally configurating wire which comprises impressing discontinuous segments of spaced, spiral, thread-like grooves at the surface of a length of wire, and simultaneously impressing said discontinuous segments in a sidewise spaced succession following a spiral path about said wire of a pitch less than the pitch of the impressed groove segments so that the groove segments extend across said path, and while impressing the groove segments in succeeding revolutions of the spiral path in general spiral alignment with the corresponding groove segments impressed in previous revolutions.

3. The method of spirally configurating wire which comprises impressing discontinuous segments of spiral, thread-like grooves at the surface of a length of wire in spaced sidewise progression about said wire in spiral revolutions having a pitch less than the pitch of the impressed discontinuous groove segments, and simultaneously impressing said discontinuous groove segments in each said spiral revolution in a path substantially contiguous with the corresponding paths of impressed groove segments in adjacent revolutions.

4. The method of spirally configurating wire according to claim 3 and characterized further in that the discontinuous groove segments in each said spiral revolution are impressed in general spiral alignment with the groove segments in each adjacent contiguous revolution.

5. The method of spirally configurating wire which comprises simultaneously impressing discontinuous segments of spiral, thread-like grooves at at least two circumferentially equally spaced positions at the surface of a length of wire, repeating said simultaneous impressing of discontinuous groove segments while maintaining the spaced relation and while progressing spirally about said wire to form said groove segments in spaced sidewise succession in spiral paths with the width and pitch of the paths being such as to form the paths in contiguous alternation along the length of wire.

6. The method of spirally configurating wire which comprises simultaneously impressing two diametrically opposed discontinuous segments of spaced, spiral, thread-like grooves at the surface of a length of wire, and simultaneously impressing said discontinuous groove segments in said diametrically opposed relation and in a spiral progression along said wire to form said groove segments in spaced sidewise succession in two complementary spiral paths with the pitch of each path being less than the pitch of the groove segments so that the groove segments extend across said paths.

7. The method of spirally configurating wire according to claim 6 and characterized in that the width and pitch of the complementary paths are such as to form the paths in contiguous alternation along the length of wire.

8. The method of spirally configurating wire according to claim 7 and characterized further in that the groove segments in each spiral path are impressed in general spiral alignment with the groove segments in the other spiral path.

References Cited by the Examiner

UNITED STATES PATENTS

| | | | |
|---|---|---|---|
| 309,439 | 12/1884 | Chillingworth et al. | 29—191.6 |
| 791,096 | 5/1905 | Hoopes | 29—193 |
| 1,151,247 | 8/1915 | Denk | 80—10.1 |
| 1,201,945 | 10/1916 | Dodds | 29—547 |
| 1,394,716 | 10/1921 | Davies | 29—193 |
| 1,533,026 | 4/1925 | Murphy | 80—24 |
| 1,840,059 | 1/1952 | Smith | 80—24 |
| 2,114,302 | 4/1938 | Harter | 29—547 |
| 2,168,340 | 8/1939 | Hill | 72—78 |
| 2,184,997 | 12/1939 | Johnson | 29—193 |
| 2,191,189 | 2/1940 | Wade | 29—193 |
| 2,341,916 | 2/1944 | Hansen | 72—224 |
| 2,720,801 | 10/1955 | Erdelyi | 72—103 |

CHARLES W. LANHAM, *Primary Examiner.*

DAVID L. RECK, R. O. DEAN, H. D. HOINKES,
*Examiners.*